Aug. 8, 1933.                    V. VOORHEES                    1,921,850
                              PROCESS OF DISTILLATION
                                Filed March 1, 1930
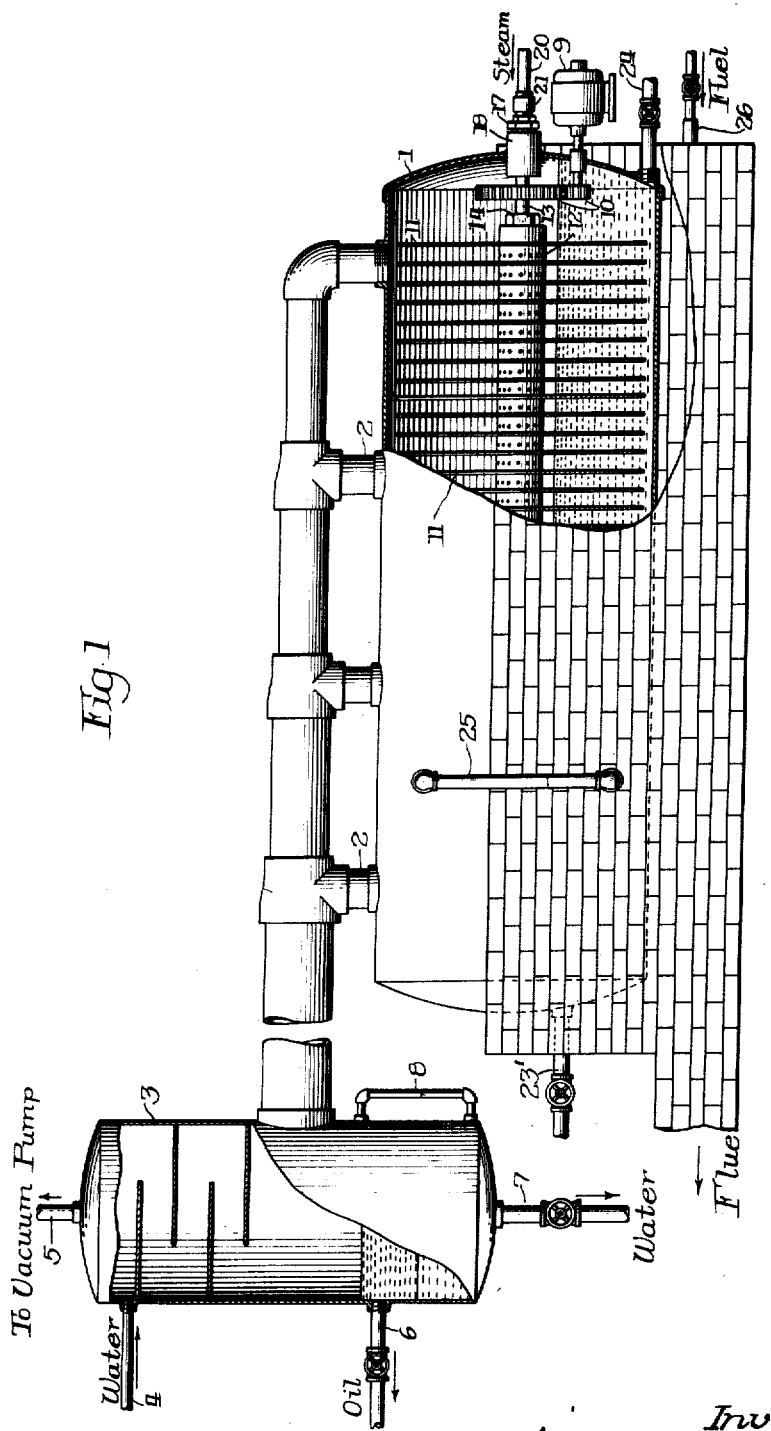
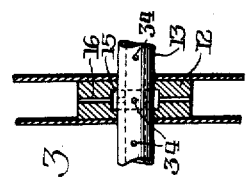
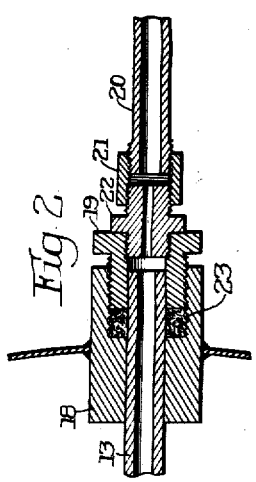
Inventor;
Vanderveer Voorhees Patented Aug. 8, 1933

1,921,850

UNITED STATES PATENT OFFICE 1,921,850

PROCESS OF DISTILLATION

Vanderveer Voorhees, Hammond, Ind., assignor to Standard Oil Company, (Indiana), Chicago, Ill., a Corporation of Indiana Application March 1, 1930. Serial No. 432,280

1 Claim. (Cl. 196—128)

This invention relates to a process of distilling liquids and in particular high boiling hydrocarbon oils such as lubricating oils and the like. One of the objects of the invention is to provide a means for distilling lubricating oils at temperatures below those required for cracking.

Another object is to avoid entrainment of liquid particles during the evaporation of the oil.

Other objects will be apparent in the following specification and drawing wherein Fig. 1 shows the invention as embodied in a shell still with vapor line and direct water condenser attached; Fig. 2 is an illustration of the gland through which steam may be introduced into the still and Fig. 3 is a detailed illustration of the method of attaching the evaporating surfaces to a rotating shaft within the still.

Referring more particularly to the drawing, Figure 1 illustrates in elevation and partly in section one form of apparatus by which my invention may be carried out. The cylindrical still 1 is shown placed in a horizontal position and connected by means of ample vapor outlets 2 to a condenser 3 which is here illustrated as a direct contact type of apparatus provided with a water inlet 4, vacuum connection 5, oil outlet 6, water outlet 7, and gauge glass 8.

Within the still 1 is mounted a shaft 13 which can revolve in bearings at each end and which may be driven as indicated by a motor 9 and gears 10. Rigidly attached to the shaft is a series of disks 11 which may be suitably made of metal. Between the disks are provided spacers 12 shown in detail in Figure 3. Disks and spacers may suitably be held to shaft 13 by means of a lock nut 14 as indicated in Figure 1. Referring to Figure 3, shaft 13 is shown to be hollow. Holes 34 are drilled at intervals into the interior of the shaft and coincide with grooves 15 within the spacers 12. The spacers are also drilled with small holes 16 leading from their perimeter to the groove 15 and spaced at regular intervals entirely around their circumference.

Referring again to Figure 1, a connection 17 is shown by which steam may be admitted into the hollow shaft 13. To avoid leakage, a packing gland is provided, shown in detail in Figure 2, in which shaft 13 enters bearing 18 and extends into the packing bushing 19. Steam is admitted through pipe 20 and couplings 21 and 22. Packing 23 prevents the escape of steam around the packing nut but permits the shaft 13 to revolve freely. It also prevents leakage of air into the interior of the still.

The still in Figure 1 is further provided with inlet and outlet pipes 23' and 24 and level gauge 25. It may be mounted on a furnace setting as shown, and heated by a burner 26.

In operation the procedure is as follows: A high boiling oil, such as, for example, 45% residue from Mid-Continent crude oil is admitted to the still through inlet line 23'. It may be advantageously preheated before entering the still either by means of a pipe heater or a heat exchanger employing waste heat from hot vapors, tar, or the like. The still is partially filled to a point slightly below the central shaft carrying the vaporizing disks 11. If the temperature of the oil is not sufficient for distillation, additional heat may be supplied by means of burner 26. I find it important to control the temperature accurately in order to obtain the best results.

When the oil has been brought to the proper temperature the shaft 13 is caused to revolve by means of motor 9 and gearing 10, and as the disks emerge from the oil into the vapor space they are coated with a film of the heated oil. Steam is admitted through pipe 20 and orifices 16, sweeping the surfaces of the vaporizing disks and thereby assisting the evaporation of the liquid which is distributed as a thin film on the vaporizing surfaces. The velocity of the steam emitted from the orifices 16 should not be sufficient to disrupt the surface of the liquid either on the vaporizing plates or the body of the oil, thereby causing undesired entrainment.

The amount of steam which is necessary to employ depends largely on the boiling point of the oil which is being distilled. With higher boiling oils it is necessary to use more steam than with lower boiling oils. I also find that the degree of vacuum necessary for operating my improved still is dependent upon the boiling point of the oils employed. Higher pressures may be used with the lower boiling oils, and oils with sufficiently low boiling points may be distilled at atmospheric pressure. However, in the latter case more steam is required.

When it is desired to fractionate an oil into a number of different fractions I find it advantageous to operate a battery of my stills in series. Residual oil from the first still is drawn off through pipe 24 and transferred while hot to the second still where further reduction takes place. This process may be continued to give any desired number of lubricating fractions, the amount of each fraction obtained being controlled by varying the temperature of each still, the degree of vacuum and the amount of steam employed. When distilling oil in this manner I prefer to operate the stills continuously and employ sucessively higher temperatures and increasing amounts of steam as the boiling point of the oil increases during the reduction.

Lubricating oils distilled in my improved still are superior to those obtained by ordinary methods of distillation, being substantially free from asphaltic, colored compounds resulting from cracking and entrainment. They accordingly contain practically no so-called "fixed carbon" and are possessed of high color stability. Because of the enormous surface provided by the vaporizing plates which I employ, I am enabled to operate with lower distillation rates per unit area than is commonly obtainable in commercial distillation apparatus. In this way I avoid the entrainment of undesirable liquid particles.

I also find it possible to distill high boiling oils at much lower temperatures than are commonly used, and avoid cracking and decomposition in this way. Consequently I obtain higher yields of viscous distillate from heavy oils than are ordinarily obtained.

I have illustrated and described a suitable form of apparatus for carrying out my process of distillation. However, it should be understood that my invention is not limited to this particular design but only as defined by the following claim.

I claim:

The process of distilling high boiling hydrocarbon oil in vacuum with substantially no cracking or entrainment of undistilled oil in the vapors, comprising maintaining a body of oil in a still at a temperature below that at which any substantial cracking occurs, alternately immersing and removing a plurality of closely spaced surfaces in said oil body at a rate sufficient to coat the emergent surfaces with a film of oil but insufficient to violently agitate the oil and produce entrainment thereof, introducing a current of steam directly into the space between said surfaces at a rate insufficient to rupture the oil film thereon and produce entailed oil particles, and withdrawing and condensing the combined steam and oil vapors from the still.

VANDERVEER VOORHEES.

---

CERTIFICATE OF CORRECTION.

Patent No. 1,921,850.　　　　　　　　　　　　　　　　August 8, 1933.

VANDERVEER VOORHEES.

It is hereby certified that error appears in the printed specification of the above numbered patent requiring correction as follows: Page 2, lines 96 and 97, the claim, for "entailed" read "entrained"; and that the said Letters Patent should be read with this correction therein that the same may conform to the record of the case in the Patent Office.

Signed and sealed this 29th day of August, A. D. 1933.

M. J. Moore.

(Seal)　　　　　　　　　　　　　　　　Acting Commissioner of Patents.

the degree of vacuum and the amount of steam employed. When distilling oil in this manner I prefer to operate the stills continuously and employ sucessively higher temperatures and increasing amounts of steam as the boiling point of the oil increases during the reduction.

Lubricating oils distilled in my improved still are superior to those obtained by ordinary methods of distillation, being substantially free from asphaltic, colored compounds resulting from cracking and entrainment. They accordingly contain practically no so-called "fixed carbon" and are possessed of high color stability. Because of the enormous surface provided by the vaporizing plates which I employ, I am enabled to operate with lower distillation rates per unit area than is commonly obtainable in commercial distillation apparatus. In this way I avoid the entrainment of undesirable liquid particles.

I also find it possible to distill high boiling oils at much lower temperatures than are commonly used, and avoid cracking and decomposition in this way. Consequently I obtain higher yields of viscous distillate from heavy oils than are ordinarily obtained.

I have illustrated and described a suitable form of apparatus for carrying out my process of distillation. However, it should be understood that my invention is not limited to this particular design but only as defined by the following claim.

I claim:

The process of distilling high boiling hydrocarbon oil in vacuum with substantially no cracking or entrainment of undistilled oil in the vapors, comprising maintaining a body of oil in a still at a temperature below that at which any substantial cracking occurs, alternately immersing and removing a plurality of closely spaced surfaces in said oil body at a rate sufficient to coat the emergent surfaces with a film of oil but insufficient to violently agitate the oil and produce entrainment thereof, introducing a current of steam directly into the space between said surfaces at a rate insufficient to rupture the oil film thereon and produce entailed oil particles, and withdrawing and condensing the combined steam and oil vapors from the still.

VANDERVEER VOORHEES.

CERTIFICATE OF CORRECTION.

Patent No. 1,921,850.　　　　　　　　　　　　　　　August 8, 1933.

VANDERVEER VOORHEES.

It is hereby certified that error appears in the printed specification of the above numbered patent requiring correction as follows: Page 2, lines 96 and 97, the claim, for "entailed" read "entrained"; and that the said Letters Patent should be read with this correction therein that the same may conform to the record of the case in the Patent Office.

Signed and sealed this 29th day of August, A. D. 1933.

M. J. Moore.

(Seal)　　　　　　　　　　　　　　　Acting Commissioner of Patents.

CERTIFICATE OF CORRECTION.

Patent No. 1,921,850.                                                                   August 8, 1933.

VANDERVEER VOORHEES.

It is hereby certified that error appears in the printed specification of the above numbered patent requiring correction as follows: Page 2, lines 96 and 97, the claim, for "entailed" read "entrained"; and that the said Letters Patent should be read with this correction therein that the same may conform to the record of the case in the Patent Office.

Signed and sealed this 29th day of August, A. D. 1933.

M. J. Moore.

(Seal)                                                                Acting Commissioner of Patents.